United States Patent
Kyrtsos et al.

(10) Patent No.: US 6,415,667 B1
(45) Date of Patent: Jul. 9, 2002

(54) DRIVE LINE VIBRATION DETECTION SYSTEM

(75) Inventors: Christos T. Kyrtsos, Southfield; Alan E. Tousignant, Clinton Township, both of MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/515,551

(22) Filed: Feb. 29, 2000

(51) Int. Cl.[7] .............................................. G08B 21/00
(52) U.S. Cl. ......................................... 73/660; 340/683
(58) Field of Search .................. 73/660, 661; 340/438, 340/683

(56) References Cited

U.S. PATENT DOCUMENTS

| | | | | |
|---|---|---|---|---|
| 4,665,393 A | * | 5/1987 | Wilder et al. ................ | 340/683 |
| 6,223,602 B1 | * | 5/2001 | Kyrtsos ........................ | 73/660 |
| 6,236,329 B1 | * | 5/2001 | Kyrtsos ....................... | 340/683 |

OTHER PUBLICATIONS

U.S. application No. 09/769,802, filed Jan. 15, 2001, entitled "Thermally Activated Sensor System".
Dallas Semiconductor DS1921, Thermochron iButton publication, Aug. 4, 1999.

* cited by examiner

*Primary Examiner*—John E. Chapman
(74) *Attorney, Agent, or Firm*—Carlson, Gaskey & Olds

(57) ABSTRACT

A device for detecting undesirable vibrations in a vehicle drive line utilizes a sensor that communicates with a controller to indicate undesirable vibrations in a drive line component. In one example, a temperature sensor is placed in a central portion of a universal joint. The temperature sensor preferably is supported within a single housing along with a transmitter that is responsive to the temperature sensor to transmit a signal to a remotely located receiver without using a hardwire connection between the transmitter and receiver. Packaging the temperature sensor, transmitter and a power source within a single housing provides the ability to seal off or close a series of lubrication channels that extend through the universal joint. In another example, a contact-based sensor provides a signal whenever a vibration of a drive line component occurs. The contact-based sensor signal preferably is processed to monitor the number of vibrations over time and a vehicle operator is provided with an indication of the level of vibrations as desired.

8 Claims, 2 Drawing Sheets

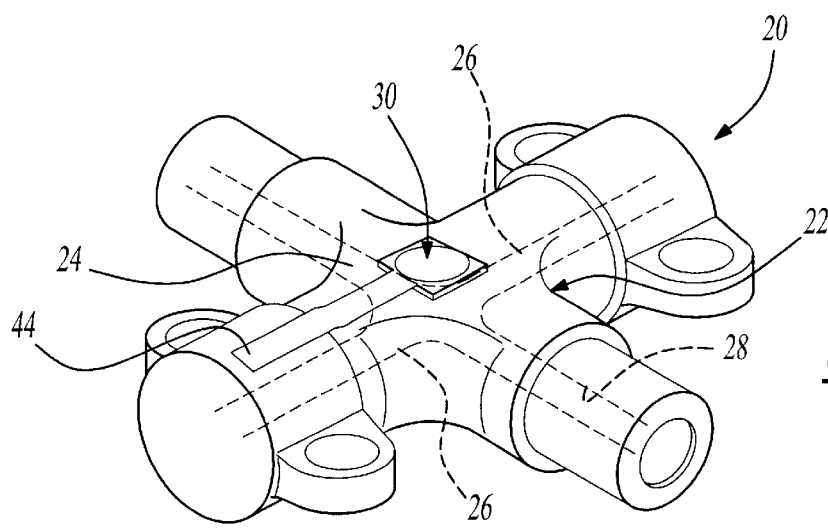
Fig-1
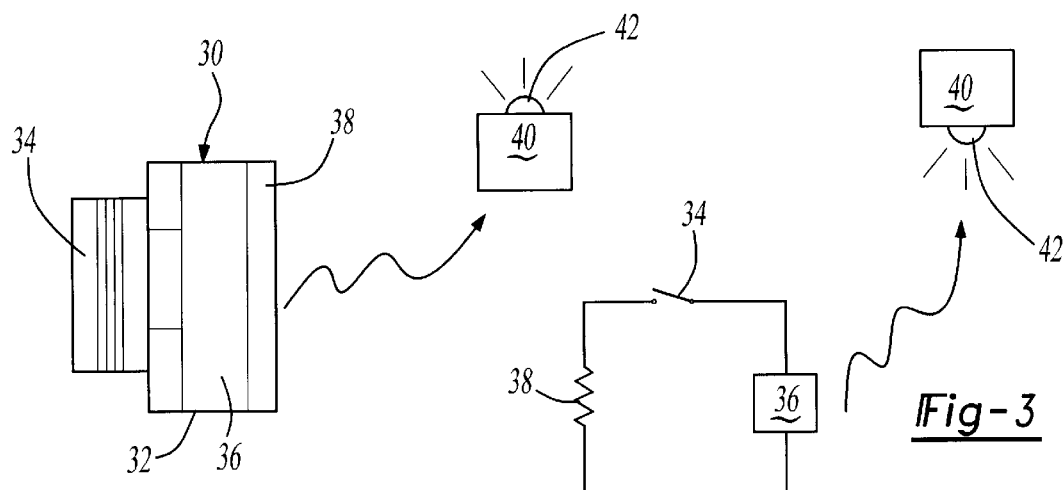
Fig-2
Fig-3
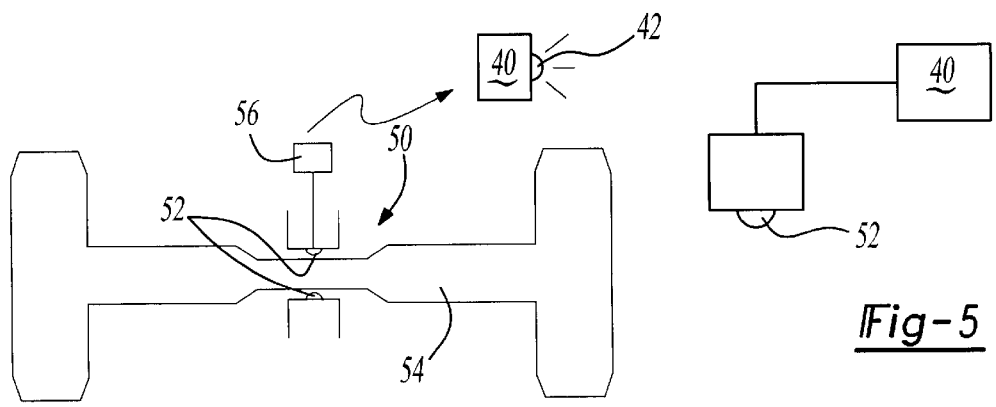
Fig-4
Fig-5

DRIVE LINE VIBRATION DETECTION SYSTEM

BACKGROUND OF THE INVENTION

This invention generally relates to a system for detecting undesirable vibrations in a vehicle drive line. More particularly, this invention relates to a temperature-based or contact-based sensor arrangement for detecting undesirable vibrations in a vehicle drive line.

Vehicle drive lines include a series of components that move responsive to a motive force provided by an engine. The drive line components include axles, driveshafts and connectors such as universal joints. Each of the components is designed to operate in a desired manner so that the components (and therefore, the vehicle) move in a chosen direction.

Due to driving conditions and vehicle operation, many of the components undergo vibrations, which cause the components to deviate from the desired direction of movement. Drive line vibrations are well known in the art. It is necessary to monitor drive line vibrations to avoid situations where the drive line components become undesirably worn or require repair.

An example of a conventional sensor arrangement is one where a universal joint having four trunions includes four separate temperature sensors one located at each of the trunions. These temperature sensors typically have a hardwire connection to a processor that provides an indication of the output of the sensors. Several difficulties are associated with such an arrangement.

First, the four individual sensors require additional materials and assembly costs. Moreover, the hardwire connections render it complicated and difficult to arrange the components within a drive line without making modifications or special considerations during the manufacturing process. Additionally, the four individual sensors tend to pros an opportunity for lubricants that flow through channels in the universal joint to leak out at the point where the sensors are connected.

There is a need for more robust and more efficient drive line vibration sensor arrangements. This invention addresses that need by providing unique arrangements that avoid the shortcomings and drawbacks of conventional systems.

SUMMARY OF THE INVENTION

In general terms, this invention is a device for detecting vibrations in a vehicle drive line component. One example of this invention has a particular use with universal joints in a vehicle drive line.

A device designed according to this invention includes a housing that is adapted to be secured to a central portion of a universal joint. A temperature sensor is supported by the housing. A transmitter is also supported by the housing that generates a signal responsive to the temperature sensor detecting a temperature in the universal joint that exceeds a selected threshold. A receiver is located remotely from the housing so that it receives a transmitted signal from the transmitter. The receiver provides an output that indicates the level of vibration of the universal joint. The communication between the transmitter and the receiver is wireless, which greatly simplifies the packaging and assembly of the device designed according to this invention.

In another example, this invention includes a sensor arrangement that has a contact-based sensor positioned near a vehicle drive line component. The contact-based sensor preferably takes one of two forms. In a first form, the contact sensor is positioned to contact the vehicle component during normal operation so that whenever the contact is broken, a vibration is detected. In a second form, the sensor normally does not contact the drive line component. When vibrations occur, the sensor is contacted and a vibration is indicated.

The contact-based sensor arrangement of this invention also includes a transmitter that sends a signal indicative of a sensed vibration. That signal is processed by a controller that provides an output to a vehicle operator indicating the level of vibrations occurring at a particular location in the drive line. A contactbased sensor arrangement of this invention can include wireless communication between the transmitter and controller or may utilize hard wire connections for signal communication.

The various features and advantages of this invention will become apparent to those skilled in the art from the following detailed description of the currently preferred embodiments. The drawings that accompany the detailed description can be briefly described as follows.

BRIEF DESCRIPTION OF THE DRAWINGS

FIG. 1 diagrammatically illustrates a universal joint including a sensor arrangement designed according to this invention.

FIG. 2 diagrammatically illustrates a sensor designed according to this invention.

FIG. 3 schematically illustrates the sensor embodiment of FIGS. 1 and 2.

FIG. 4 illustrates another example sensor arrangement designed according to this invention.

FIG. 5 schematically illustrates another embodiment of this invention.

DETAILED DESCRIPTION OF THE PREFERRED EMBODIMENTS

Figure 6:
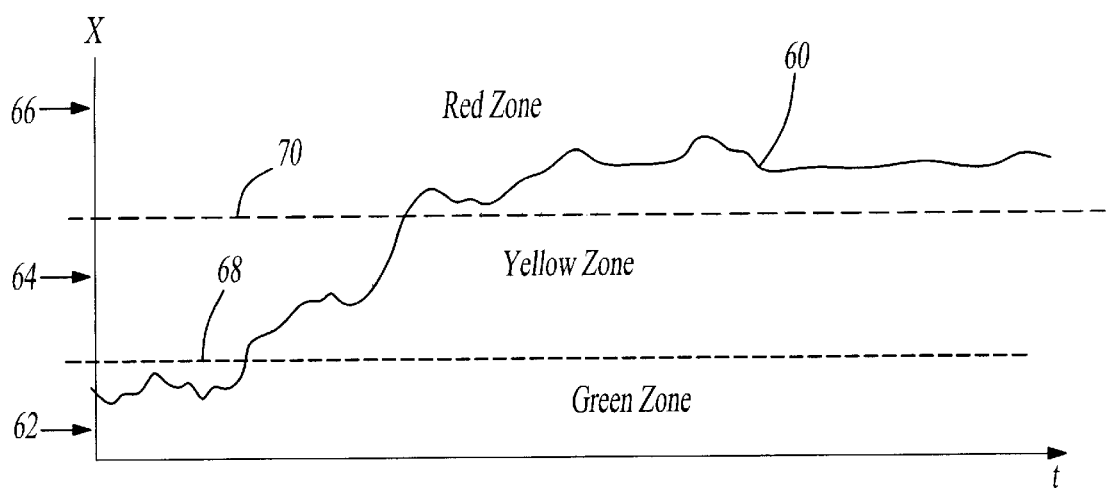
FIG. 6 graphically illustrates information provided by a device designed according to this invention.

FIG. 1 diagrammatically illustrates a device 20 designed according to this invention. A universal joint 22 includes a central portion 24 and a plurality of trunions 26. The universal joint 22 provides a connection between drive line components that allows movement along two independent axes. The universal joint 22 includes lubrication channels 28 that allow lubricants to flow through the body of the universal joint 22. Since universal joints are well known in the art, no further description of the structure or operation of the universal joint is needed.

A sensor device 30 is positioned in the central portion 24 of the universal joint 22. As best seen in FIG. 2, the sensor device 30 includes a housing 32 that houses a thermally sensitive sensor 34, a transmitter portion 36 and a power source 38. Example temperature sensors include thermistors, RTD's, or thermocouples. In one example, the thermally sensitive sensor 34 is a thermostat that functions much like a normally open switch. This is schematically illustrated in FIG. 3. When the temperature in the central portion of 24 of the universal joint 22 exceeds a preselected threshold, the thermostat sensor 34 closes and the transmitter portion 36 is energized by the power source 38 to transmit a signal to a receiver unit 40.

A particularly advantageous feature of this invention is that the communication between the transmitter 36 and the receiver 40 is wireless. Infrared, microwave or radio frequency signals may be used to provide communication between the transmitter 36 and the receiver 40. When the receiver 40 receives a signal from the transmitter 36, it provides an output to a driver of the vehicle that the universal joint 22 has reached a critical temperature. The output can be a visible or audible signal for the driver such as schematically illustrated at 42.

In a universal joint, the trunions 26 typically heat up during undesirable vibrations of the drive line components. This invention recognizes that individual trunions may reach a critical temperature before the central portion 24 reaches the same temperature because of the heat transfer properties of the universal joint structure. Therefore, the chosen thermally sensitive sensor 34 preferably operates to cause the transmitter 36 to provide a signal before any one of the trunions reach the critical temperature. With one example, a critical temperature is over 200° F. The temperature sensor 34 preferably responds to a temperature that is less than the critical temperature recognizing that a lower temperature across the central portion of the universal joint 22 is sufficiently high when at least one trunion is reaching the critical temperature. In one example, a temperature of approximately 150° F. at the central portion is considered high enough to indicate a critical temperature at a trunion.

An alternative arrangement is illustrated in FIG. 1 where a thermally conductive element 44 is included (only one is illustrated) to transfer the temperature from the trunions directly to the temperature sensor 34 so that a more direct reading of the actual trunion temperature is accomplished.

Another advantageous feature of this invention is that it includes only one sensor within the universal joint. This reduces the number of sensors compared to conventional arrangements, which typically includes four individual sensors. The housing 32 preferably include a threaded, bolt-like arrangement surrounding the temperature sensor 34 that is secured to an opening provided in the universal joint central portion 24. The housing 32 serves as a plug to close off the lubrication channels 28 within the universal joint 22. Having a single sensor compared to the multiple sensors required in conventional arrangements reduces the opportunity for lubricants to be lost over the lifetime of the drive line. Moreover, utilizing a single sensor designed according to this invention greatly simplifies the manufacturing and assembly process. This invention provides the transmitter, power source and sensor within a single unitary housing, which is a significant improvement in the packaging of a vehicle drive line vibration detection system. This invention also includes the possibility of adding other sensors such as vibration sensors.

FIG. 4 illustrates another example of a vibration detection system designed according to this invention. In the arrangement illustrated at 50, contact sensors 52 are provided adjacent a drive line component 54. The contact sensors 52 can be the type that are positioned to normally contact the component 54. In such an arrangement, whenever the component 54 deviates from its normal position due to drive line vibrations, contact with at least one of the sensors 52 will be lost. Whenever such contact is broken, a transmitter 56 provides a signal to a receiver 40 that processes the signal as will be described below. The receiver 40 can be a conventional microcontroller, for example. The communications between the transmitter 56 and the receiver 40 can be wireless as schematically illustrated in FIG. 4 or a hardwire connection as schematically illustrated in FIG. 5.

Alternatively, the sensors 52 can be positioned to normally not contact the component 54. Whenever drive line vibrations occur, at least one of the sensors 52 will be contacted by the drive line component 54, such as a driveshaft. Each time that contact is made, a signal preferably is generated by the sensors 52. The signal can then be communicated from the transmitter 56 to the receiver 40. In situations where a hardwire connection is utilized, the transmitter 56 may be eliminated so that the sensor 52 provides a signal directly to the receiver 40.

Some vibrations are acceptable in a vehicle drive line. Therefore, the embodiments of FIGS. 4 and 5 preferably do not provide an indication to the driver for every vibration that occurs. Instead, it is preferred that the sensor signal information regarding vibrations of the drive line component 54 be processed to determine the amount or level of vibrations occurring at any time. FIG. 6 illustrates a plot 60 of the number of vibrations determined over time. Three separate zones are illustrated with a first zone at 62, which is associated with a relatively low number of vibrations. A second zone 64 is associated with a higher amount of vibration, although within an acceptable range. A third level 66 is illustrated where the number of vibrations occurring at the drive line component 54 are considered excessively high.

The receiver 40 preferably processes the signals from the sensors 52 and monitors the number of vibrations detected. When a first threshold level 68 is reached, a first signal can be provided to the driver indicating that the level of vibrations is within the second zone 64 although that level is acceptable. Once the number of vibrations exceeds a selected threshold 70, the driver preferably is provided with a warning signal indicating that the number of vibrations is within the third level 66, which is considered unacceptable. Too many vibrations on a drive line component can be indicative of a problem in the drive line or improper operation by the vehicle operator. Therefore, a visible or audible signal preferably is provided to advise the driver to take some action to avoid damage to the drive line components.

Although two sensors are illustrated in FIG. 4, it is possible to have a single sensor associated with a chosen drive line component. Additionally, this invention allows individual sensors for every drive line component, which would be subject to vibration investigation, to provide independent signals that can be processed and provide multiple levels of information on a component-by-component basis.

Given this description, those skilled in the art will be able to select from among commercially available microcontrollers to perform the functions of the receiver 40 described above. Similarly, those who have the benefit of this description will be able to appropriately program such a microcontroller to accomplish the results desired for a given vehicle or a drive line system. The preceding description provides example arrangements designed according to this invention. The description, however, is not to be construed in a limiting way. Variations and modifications to the disclosed embodiments may become apparent to those skilled in the art that do not necessarily depart from the basis of this invention. The scope of legal protection given to this invention can only be determined by studying the following claims.

What is claimed is:

1. A device for detecting vibrations of a component in a vehicle driveline, comprising:

a contact-sensitive sensor positioned near a driveline component that provides a signal each time that a preselected contact condition between the sensor and the component occurs; and a controller that processes signals from the sensor and provides an indication of an amount of vibration activity at the component based upon the number of vibrations occurring over time when the amount of vibrations exceeds a preselected threshold.

2. The device of claim 1, wherein the sensor is positioned to normally contact the drive line component and wherein a signal is provided each time that the contact is broken.

3. The device of claim 1, wherein the sensor is positioned to normally not contact the drive line component and a signal is generated each time that contact is made between the sensor and the component.

4. The device of claim 1, wherein the controller provides an output to a vehicle operator indicative of the vibration activity.

5. The device of claim 4, wherein the controller determines whether the level of vibrations over time is within a first expected level, a second acceptable level, or a third undesirable level.

6. The device of claim 5, wherein the controller provides a first output to the vehicle operator when the vibration level is within the second level and a second output to the vehicle operator when the vibration level is within the third level.

7. A method of monitoring vibrations of a component in a vehicle driveline, comprising the steps of detecting a number of vibrational movements of the driveline component over time;

determining whether the number of vibrations over time is within a first expected level;

determining whether the number of vibrations over time is within a second acceptable level;

determining whether the number of vibrations is within a third undesirable level; and providing an output to a vehicle operator indicating when the number of vibrations is within the second or third levels.

8. The method of claim 7 including providing a first output to the vehicle operator when a number of vibrations is within the second level and providing a second output to the vehicle operator when the number of vibrations is within the third level.

* * * * *